United States Patent
De Vries

[15] 3,694,676

[45] Sept. 26, 1972

[54] SHEAR MODE PIEZOELECTRIC FILTER

[72] Inventor: Adrian J. De Vries, Elmhurst, Ill.

[73] Assignee: Zenith Radio Corporation, Chicago, Ill.

[22] Filed: March 17, 1971

[21] Appl. No.: 125,244

[52] U.S. Cl...................310/9.5, 178/5.4 R, 310/8.1, 333/72

[51] Int. Cl...............................................H01v 7/00

[58] Field of Search..............310/9.5, 8, 8.1, 8.2, 8.5; 333/70 R, 70 S, 70 T, 72; 178/5.4 R, 5.4 SD

[56] References Cited

UNITED STATES PATENTS

| | | | |
|---|---|---|---|
| 2,484,635 | 10/1949 | Mason | 310/9.5 |
| 2,669,666 | 2/1954 | Mason et al. | 310/9.5 X |
| 3,311,854 | 3/1967 | Mason | 310/9.5 |
| 3,334,251 | 8/1967 | Royer | 310/9.5 |
| 3,363,119 | 1/1968 | Koneval et al. | 310/9.5 |

OTHER PUBLICATIONS

Piezoelectric Ceramics, Jaffe, Cook & Jaffe, Academic Press, 1971, pp. 277– 278.

Ultrasonic Transducer Materials, Mattiat, Plenum Press, 1971, pp. 72– 75

*Primary Examiner*—J. D. Miller
*Assistant Examiner*—Mark O. Budd
*Attorney*—John J. Pederson and John H. Coult

[57] ABSTRACT

A rectangular block of piezoelectric material serves as a filter for electric signals, presenting series resonance at a selected frequency between a pair of terminals. The block has a length and height substantially greater than its thickness and is poled in the direction of the thickness. A pair of electrodes on opposing faces of the block are coupled respectively to the terminals for developing a signal field transverse to the thickness direction and, in response to which, shear waves are propagated in the block. The thickness is one-half the shear wavelength. To prevent the development of spurious wave modes, the ratio of the height to the thickness is an odd integer.

1 Claim, 5 Drawing Figures

Inventor
Adrian J. DeVries
By Francis W. Crotty
Attorney

SHEAR MODE PIEZOELECTRIC FILTER

BACKGROUND OF THE INVENTION

The present invention pertains to wave filters. More particularly, it relates to a solid-state device which serves to filter signal energy at a desired frequency.

The art of filtering electrical signals has become so well developed that entire textbooks have been devoted to the subject. One familiar approach to the design of a signal filter involves the use of inductors, capacitors and/or resistors arranged in various networks, each affording a particular signal transmission characteristic. The resonance properties of piezoelectric elements have also found advantage utilization for the purposes of achieving a tailored frequency response to signals. Piezoelectric filters have found wide-spread usage particularly where a very narrow bandpass or notch characteristic is desired, either for the purpose of transmitting only signals in a limited frequency range or for shunting out of the signal transmission path any signals within such a limited range. Generally speaking, filters composed of passive circuit elements are at least somewhat bulky and cumbersome, while piezoelectric filters tend to be expensive.

It is known that devices in which acoustic waves propagate may be dimensioned to exhibit selected resonant characteristics. Hence, such devices may likewise be employed in filter systems, utilizing the various modes of wave propagation of which they are capable. In attempting, however, to utilize the shear mode, spurious effects may be encountered by reason of the development of waves in other than the shear mode.

It is, accordingly, a general object of the present invention to provide a new and improved solid-state filter which overcomes the aforenoted disadvantages.

Another object of the present invention is to provide a new and improved solid-state filter which is simple to fabricate and is small, compact and inexpensive.

A specific object of the present invention is to provide a new and improved filter that includes a shear-wave resonator in which the development of spurious modes is not experienced.

SUMMARY OF THE INVENTION

A signal filter constructed in accordance with the invention presents series resonance between a pair of terminals at a predetermined frequency. The filter is composed of a generally rectangular block of piezoelectric material, having a length and height substantially greater than its thickness and it is poled in the direction of that thickness. The thickness is one-half of the shear wavelength at the predetermined frequency, and the ratio of the height to thickness is an odd integer. Coupled between the terminals are means for developing a signal field, including signals of the predetermined frequency, transverse to the thickness direction in the height direction and, in response to which, the shear waves propagate in the block.

BRIEF DESCRIPTION OF THE DRAWING

The features of this invention which are believed to be novel are set forth more particularly in the appended claims. The invention, together with further objects and advantages thereof, may best be understood, however, by reference to the following description taken in conjunction with the accompanying drawing, in the several figures of which like reference numerals identify like elements, and in which:

DESCRIPTION OF THE PREFERRED EMBODIMENT

Figures 1, 4A, 4B:
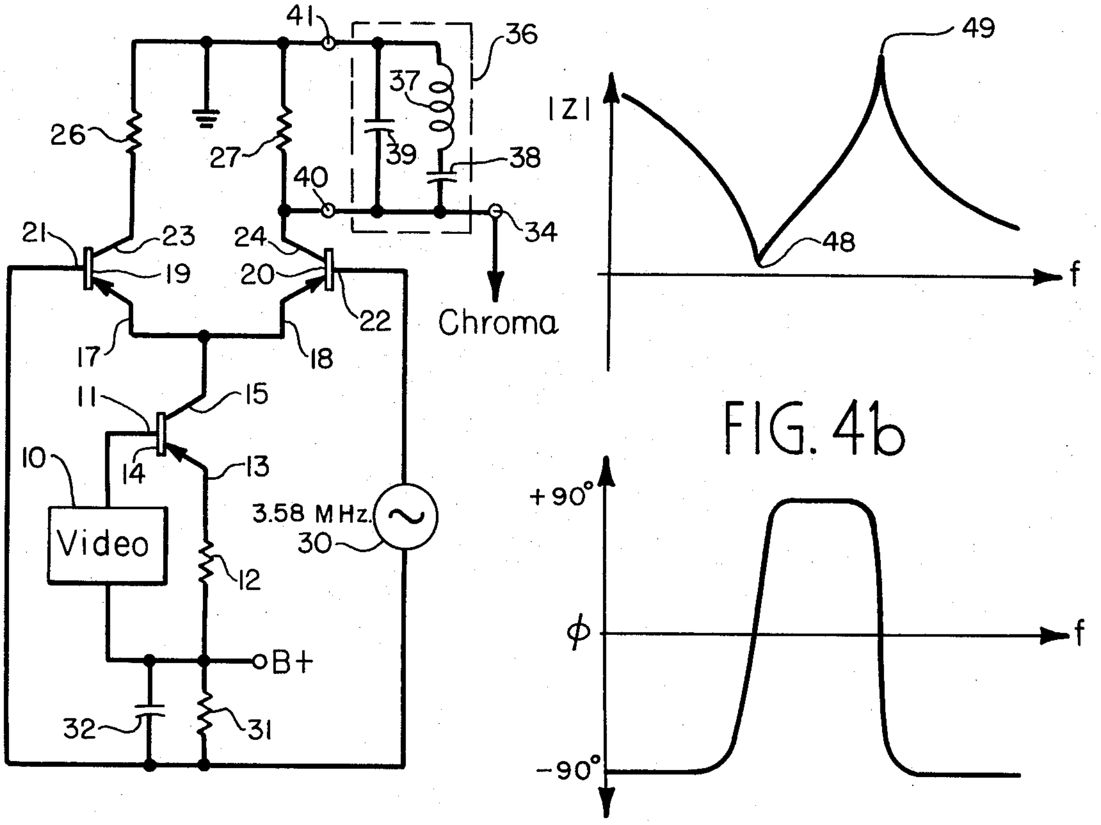
FIG. 1 is a schematic diagram of a signal processing system in which a signal filter is used.
FIGS. 4*a* and 4*b* are plots depicting characteristics of the device of FIG. 2.

By way of illustrating a system in which filters of the invention find particularly advantageous application, FIG. 1 represents a portion of a color television receiver. Typically, a composite radio-frequency television signal is received and converted to a lower intermediate-frequency signal from which a video signal is detected. A portion of that video signal, containing the color or chroma information modulated upon a 3.58 mHz subcarrier, is fed to a demodulator wherein the chroma information is removed from the subcarrier for subsequent processing and use in the reproduction of a color picture. Accordingly, a source 10 of video signals is connected between the base 11 and, through a bias resistor 12, the emitter 13 of a pnp transistor 14. The amplified video signal appearing at collector 15 of this transistor is fed in parallel to the emitters 17 and 18, respectively, of transistors 19 and 20 that also have respective bases 21 and 22 and collectors 23 and 24. The latter are connected in parallel to ground through respective load resistors 26 and 27.

Acting together, transistors 19 and 20 serve as a demodulator. To this end, a source 30 of 3.58 mHz reference signal is connected between bases 21 and 22. The side of bias resistor 12 remote from emitter 13 is connected through a DC coupling resistor 31 to one side of source 30, and resistor 31 also is bypassed by a capacitor 32. The positive terminal B+ of a unidirectional power supply is connected to the junction of resistors 12 and 31, to the negative terminal of that supply being returned to ground. In operation, the heterodyning within the demodulator of the 3.58 mHz signal from source 30 and the modulated video signal from source 10 results in the appearance across load resistor 27 of the chroma signal components which may be derived from an output terminal 34.

In the operation of the demodulator, a large amount of the 3.58 mHz signal component appears across load resistor 27 and it is customary to include a filter 36 in the output video path to severely attenuate that component. As shown in FIG. 1, filter 36 includes the series combination of an inductor 37 and a capacitor 38 shunting load resistor 27. Inductor 37 and capacitor 38 exhibit series resonance at the 3.58 mHz frequency so as to shunt to ground any signal energy present at that frequency. Another capacitor 39, which also shunts load resistor 27 and often represents parasitic capacitance, will suppress harmonics of the 3.58 mHz component. In their usual forms, inductor 37 is a wound coil and capacitor 38 is a discrete element. A similar filter may, if desired, be connected across load resistor 26 to provide a second output.

Figure 2:
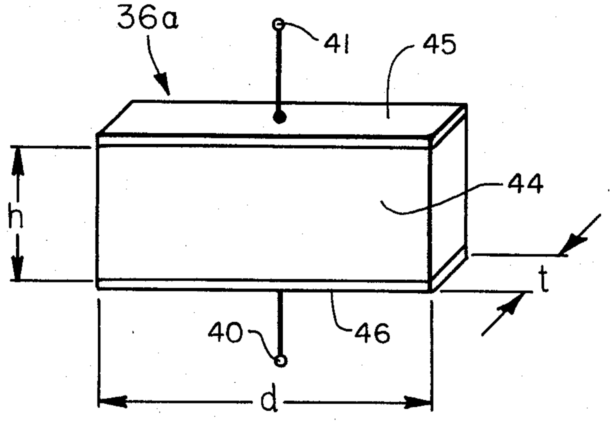
FIG. 2 is a perspective view of one embodiment of a solid-state signal filter.

FIG. 2 depicts a solid-state filter 36a which may be substituted for filter 36 in FIG. 1 as indicated by terminals 40 and 41 which may be connected at opposite ends of load resistor 27. Filter 36a is comprised of a rectangular block 44 of piezoelectric material, such as PZT, having a length *d* and a height *h* both of which are substantially greater than its thickness *t*. Moreover, block 44 is poled in the thickness direction *t*. It may be noted in passing that other piezoelectric materials may require a different, but equivalent, direction of poling. Fixed to the opposing faces which define the height *h* of block 44 are a pair of electrodes 45 and 46 to which terminals 40 and 41 are electrically connected.

Figure 3:
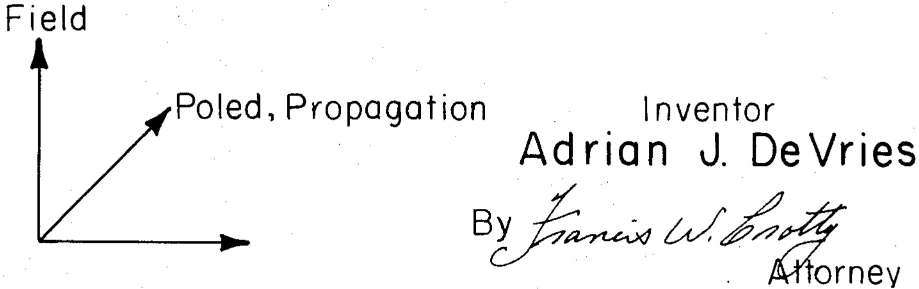
FIG. 3 is a plot of vectors useful in explanation of the operation of the embodiment of FIG. 2.

When filter 36a is installed in the circuit of FIG. 1, the demodulated chroma signals are impressed across electrodes 45 and 46 and develop a signal field which extends through the material of block 44 in a direction transverse to the thickness direction *t*. In response to signal components of a particular frequency, in FIG. 1 the 3.58 megahertz reference signal frequency, shear waves are launched within the body of the block. As shown by the plot in FIG. 3, wherein the direction of the applied signal field is vertical and block 44 is shown as poled in the thickness direction as described, the direction of propagation of the shear waves is also in the thickness direction.

At the frequency for which thickness *t* is one-half the wavelength of the shear waves in the material of the block, filter 36a exhibits resonance of the series type. FIG. 4a depicts the impedance-frequency characteristic of the filter. The condition of minimum impedance at point 48, where the curve approaches the zero axis, represents the condition of series resonance which is the response to the 3.58 mHz signal component. A condition of parallel resonance would be reached at a higher frequency as indicated at the peak 49. Above that frequency of parallel resonance as well as below the frequency of series resonance, the device becomes capacitively reactive as is indicated in the plot of FIG. 4b.

As already mentioned, it is the thickness *t* which is the frequency determining parameter of the filter. This condition holds so long as length *d* and height *h* are very much larger than the thickness *t*. Further, in order to avoid spurious activation in other acoustic wave modes, the ratio of height *h* to thickness *t* is selected to be an odd integral number. Having, therefore, selected thickness *t* properly in order to obtain the desired resonant frequency while at the same time keeping in mind the requirement that *h/t* be an odd integer, the specific values of height *h* and length *d* are chosen for overall best performance. The combination of height *h* and length *d* determines the impedance level, that level being approximately the same for any given ratio of *d/h*. Of course, the overall size is basically governed by the height and the length. So long as length *d* of block 44 is very large as compared to the thickness, there is no criticality in the exact length and its particular value is unimportant except as it contributes to the impedance. It is, then, the ratio *h/t* that determines the magnitude and position on the impedance characteristic of spurious modes. The use of an odd integral value of *h/t* prevents the coincidence of a spurious mode with the desired mode. In a typical embodiment wherein the material of block 44 is Honeywell S, a lead zirconate titanite ceramic (PZT), thickness *t* is between 10 and 12 mils. Correspondingly, height *h* is between 50 and 60 mils, while length *d* is about 150 mils. Thus, the ratio *h/t* is five.

The entire filter constitutes little more than a quite small block of easily fabricated material to which it is only necessary to affix a pair of electrodes and the conductive connections to those electrodes. Accordingly, a reliable solid-state filter is provided which is simple and compact while at the same time being comparatively inexpensive to manufacture.

While a particular embodiment of the present invention has been shown and described, it is apparent that changes and modification may be made therein without departing from the invention in its broader aspects. The aim of the appended claims, therefore, is to cover all such changes and modifications as fall within the true spirit and scope of the invention.

I claim:

1. A signal filter, presenting series resonance between a pair of terminals at a predetermined frequency, comprising:

a block of piezoelectric material having a length and height substantially greater than its thickness and poled in the direction of said thickness, said thickness being equal to one-half the wavelength of shear waves at said predetermined frequency propagating in said block in the direction of said thickness and the ratio of height to thickness in said block being substantially an odd integer;

and means coupled to said terminals for developing a signal field, including signal components of said predetermined frequency, transverse to said thickness direction in the direction of said height and, in response to which, said shear waves propagate in said block.

* * * * *